United States Patent

[11] 3,611,055

| [72] | Inventors | Dominic J. Zeppieri;<br>Albert Barbuto, both of North Adams, Mass. |
|---|---|---|
| [21] | Appl. No. | 31,470 |
| [22] | Filed | Apr. 24, 1970 |
| [45] | Patented | Oct. 5, 1971 |
| [73] | Assignee | Sprague Electric Company<br>North Adams, Mass. |

[54] SOLID ELECTROLYTE CAPACITOR
8 Claims, 2 Drawing Figs.

| [52] | U.S. Cl. | 317/230, 29/569 |
|---|---|---|
| [51] | Int. Cl. | H01g 9/08 |
| [50] | Field of Search | 317/230, 231, 233 |

[56] References Cited
UNITED STATES PATENTS

| 3,403,303 | 9/1968 | Klein | 317/230 |
|---|---|---|---|
| 3,440,495 | 4/1969 | Howard et al. | 317/230 |
| 3,465,426 | 9/1969 | Baier et al. | 317/230 |
| 3,530,342 | 9/1970 | Klein | 317/230 |

*Primary Examiner*—James D. Kallam
*Attorneys*—Connolly and Hutz, Vincent H. Sweeney and James P. O'Sullivan ABSTRACT: A flat solid electrolyte section is bonded within a metal tray, which is mounted on and directly connected to the baseplate of the package. An anode lead extends laterally from the section to a glass-to-metal terminal of the plate, and a cup-shaped cover is inverted over the section and is bonded to the plate to provide a hermetically sealed unit.

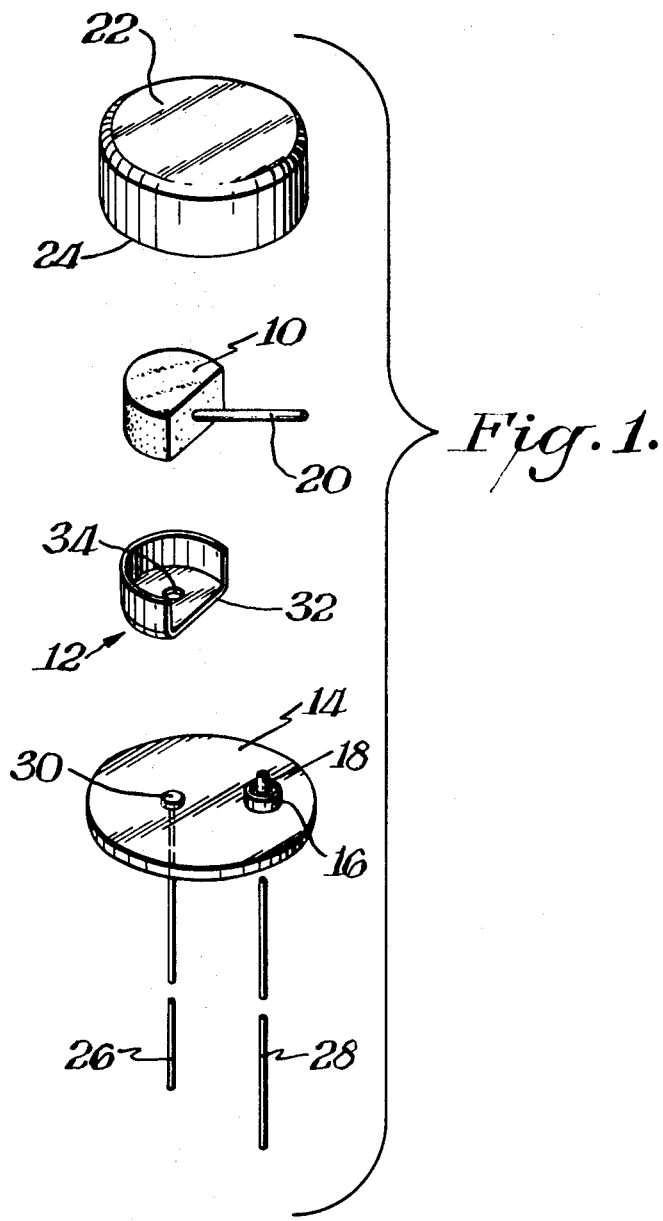
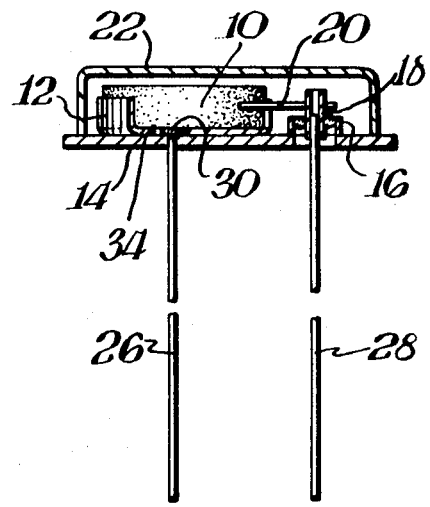

SOLID ELECTROLYTE CAPACITOR

BACKGROUND OF THE INVENTION

This invention pertains to solid electrolyte capacitors and more particularly to solid electrolyte capacitors having a flat section enclosed within a low silhouette package.

Solid electrolyte capacitors are valued for their large capacitance for given size. However, construction of individual small units often provide fabrication difficulties. In one type of prior art construction, a flat solid electrolyte section is soldered to the baseplate of the package, with its anode lead laterally extended to an insulated terminal of the plate. However, a reliable mechanical and electrical connection between the section and plate is difficult to achieve.

SUMMARY OF THE INVENTION

It is an object of this invention to provide a miniature solid electrolyte capacitor of high reliability.

It is another object of this invention to provide a solid electrolyte capacitor having a flat solid electrolyte section secured in good mechanical and electrical connection to the package baseplate.

These and other objects of the invention will be apparent upon consideration of the following specification and claims taken in conjunction with the drawing.

Broadly, a solid electrolyte capacitor provided in accordance with the invention comprises a metal plate having a insulatively mounted terminal extending therethrough, a metal tray mounted on said plate adjacent to said terminal, a solid electrolyte capacitance section secured within said tray in cathodic connection thereto and in anodic connection to said terminal, and a cover disposed over the combination and sealed to the plate.

Preferably, the section is made up of a flat approximately semicircular pellet having its anode lead extended laterally from the flat edge of the disc, and the tray includes an approximately semicircular base, conforming to the section, with short upright sides along its curved edges.

BRIEF DESCRIPTION OF THE DRAWING

FIG. 1 is an exploded view of elements employed in the preferred embodiment; and FIG. 2 is an elevated view partly in section of a completed solid electrolyte capacitor constructed in accordance with the invention.

DESCRIPTION OF THE PREFERRED EMBODIMENT

As shown in FIGS. 1 and 2, a capacitance section 10 is soldered within a cuplike tray 12 to provide the cathodic connection of section 10. Section 10 is an anodized pellet of tantalum of the like produced in a conventional manner with a tantalum anode wire or lead 20 welded thereto or buried therein. After anodization, the pellet is impregnated with a semiconductor electrolyte such as lead dioxide or manganese dioxide, followed by application of a conducting cathodic surface and an outer coating of conductive fusible material such as solder or the like. Such a unit section is described in detail in U. S. Letters Pat. No. 2,936,514 issued to R. J. Millard on May 17, 1960.

Tray 12 is mounted directly on and secured to a metal plate 14 by welding or the like. Plate 14 includes a glass-to-metal seal 16 which includes an insulatively mounted terminal 18. Anode lead 20 extends between, and interconnects, section 10 and terminal 18. The combination is enclosed within a cover 22 which is joined at its open end 24 to plate 14. A cathode lead 26 and anode lead 28 extend from the underside of plate 14 to provide connection to the external circuit.

In the preferred embodiment, plate 14 is a circular flat plate or disc of kovar, or the like, to which a conventional glass-to-metal seal 16 and leads 26, 28 are assembled. Seal 16, which includes a tubular center terminal 18 of kovar or the like, is mounted on plate 14 in a conventional manner. Terminal 18 is located off the plate center, near one edge to allow room for capacitor section 10.

In this embodiment cathode lead 26 is a nailhead lead having its head 30 secured to the upper surface of plate 14 by conventional welding or brazing, or the like. The thickness of base 32 of tray 12 is made approximately equal to or greater than that of nailhead 30, and includes an aperture 34 of larger diameter than head 30 such that upon assembly to plate 14, a flush support surface of large area is provided for section 10.

In a specific example, a kovar metal plate 0.015 inch thick, 0.590 inch in diameter was prepared with an 0.060-inch diameter nailhead cathode lead located approximately 0.0230 inch from one edge and with a 0.125-inch diameter glass-to-metal seal located approximately 0.150 inch from the opposite edge. The cathode lead shank was approximately 0.024 inch square.

A tray of nickel material having a flash coating of copper was welded to the plate around the cathode lead. The tray material was 0.016 inch thick and included a 0.125-inch diameter aperture which was positioned over the lead nailhead. The tray was approximately semicircular in shape, having an outer diameter of 0.512 inch with a flat located approximately 0.335 inch from the curved edge, and with 0.115-inch high sides along its curved edges such that it provides an open-sided tray.

An approximately semicircular tantalum pellet section 0.100 inch thick with a 0.470-inch diameter and a flat located at approximately 0.320 inch from the curved edge, was formed with an outer layer of solder on all surfaces but the flat edge; from which a centrally located 0.015-inch diameter tantalum leadwire was perpendicularly extended.

The section was seated within the tray and heated to flow its solder into bonding contact therewith. Its anode lead was then welded to the center terminal of the glass-to-metal seal, and an 0.024-inch square lead was soldered within and extended from the center terminal. A cuplike cover of 0.015-inch thick kovar, having an inside diameter of approximately 0.520 inch and sides 0.145 inch high was then inverted over the section and continuously welded to the plate adjacent to the plate perimeter to complete the unit.

A substantially semicircular section and tray are employed in the preferred embodiment; however, other shapes such as a full circle, or rectangular, etc., may be useful. In each case, the tray sides are designed to conform to at least a substantial portion of the perimeter. An open side portion is also preferable for lateral extension of the anode lead.

What is claimed is:

1. A solid electrolyte capacitor comprising a metal plate, an insulatively mounted terminal disposed within said plate, a metal tray mechanically and electrically secured to said plate in spaced relation to said terminal, said tray having a base with substantially upright sides around at least a portion of its perimeter, a solid electrolyte section disposed in said tray, said sides of said tray conforming to at least a portion of the perimeter of said section, said section having an outer conductive coating of fusible material secured to the inside of said tray so as to provide cathodic connection of said section, an anode lead of said section in connection to said terminal, and a cover disposed over the tray-section assembly and said terminal and secured at its open end to said plate.

2. The capacitor of claim 1 wherein an opening is provided along one edge of said tray, and said anode lead extends laterally from one side of said section through said opening to said terminal.

3. The capacitor of claim 2 wherein said base of said tray is welded to said plate.

4. The capacitor of claim 2 wherein a cathode lead extends through said plate, said tray includes an aperture adapted to accept the end of said cathode lead, and said base of said tray being equal to or thicker than the height of said end so as to allow said section to seat on said base.

5. The capacitor of claim 2 wherein said section is made up of a flat disc-shaped pellet.

6. The capacitor of claim 5 wherein said pellet is a cylindrical discnshaped body having a flat along one edge thereof, said anode lead is extended from said flat and said tray is a shallow cup-shaped body having its base substantially conforming to the shape of the major surfaces of said pellet and its upright sides disposed along the curved edges thereof.

7. The capacitor of claim 6 wherein said pellet is approximately semicircular.

8. The capacitor of claim 7 wherein said plate is a flat circular plate, said terminal is secured to said plate in a glass-to-metal seal, and said cover is an inverted cup-shaped metal container continuously welded at its open end to plate.